Dec. 13, 1932.   S. G. MANDALIAN   1,890,819

SOUND TRANSMITTING AND LIGHT REFLECTING SCREEN

Filed Aug. 6, 1930

INVENTOR
Sahatiel G. Mandalian
BY
ATTORNEYS.

Patented Dec. 13, 1932

1,890,819

UNITED STATES PATENT OFFICE

SAHATIEL G. MANDALIAN, OF NORTH ATTLEBORO, MASSACHUSETTS

SOUND TRANSMITTING AND LIGHT REFLECTING SCREEN

Application filed August 6, 1930. Serial No. 473,353.

This invention relates to improvements in metal fabrics which are particularly adapted for use in talking motion picture art.

One of the objects of this invention is the provision of an articulated metal fabric sound transmitting and light reflecting screen.

Another object of this invention is to produce a screen of this type made up of a number of small regularly shaped pieces of metal united together to produce a flexible metal screen having openings between the pieces of metal to permit the passage of sound waves therebetween.

A further object of this invention is the provision of a screen of this type having a coating on the picture display surface which is both intensely white and extremely dull.

A further object of this invention is the provision of a light reflecting screen broken up into separating portions to provide spaces therebetween with the relation between the area of the light reflecting surface of the screen and the area of the opening properly proportioned so as to give good sound transmission without materially interfering with the proper display of the picture.

Another object of this invention is the provision of a coating compound for screens of this type which produces an adherent, intensely white, sufficiently plastic and dull surface for the proper display of motion pictures thereon.

These and many other objects as will appear from the following disclosure are secured by means of this invention.

This invention resides substantially in the construction, combination, arrangement and relative location of parts all as will be set forth in detail below.

Referring to the drawing.

Figures 1, 3:
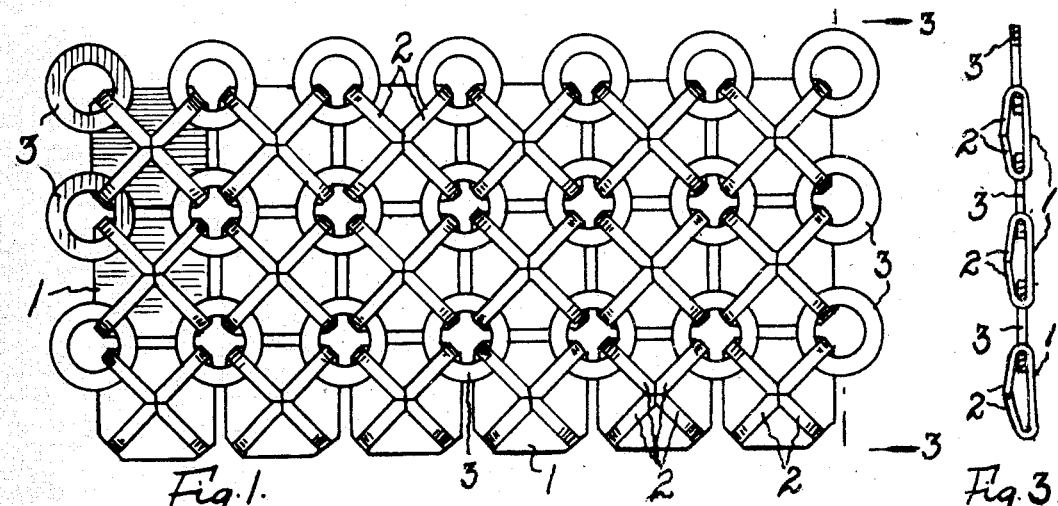
Figure 1 is a rear view of a portion of a metal fabric made in accordance with the principles of this invention.
Fig. 3 is a cross sectional view taken on the line 3—3 of Fig. 1.
Figure 2:
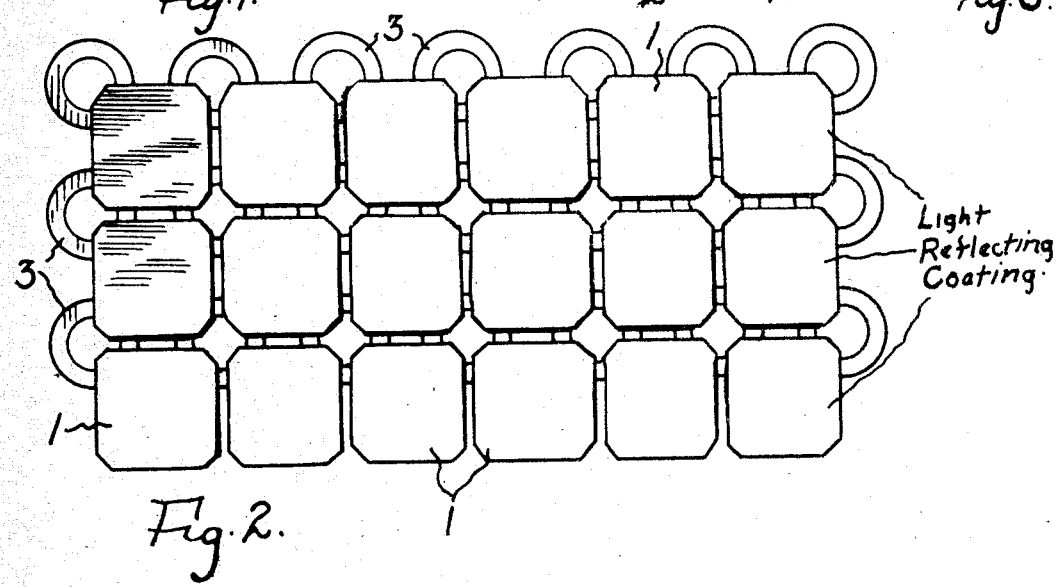
Fig. 2 is a front view of this metal fabric.

It is the desirable practice at the present time in the talking motion picture art to provide a picture display screen so constructed that the sound reproducing devices may be mounted behind the screen to aid in the illusion of having the sounds appear to issue directly from their sources displayed in the picture. This requires a screen which efficiently transmits sounds through the screen without materially impairing its qualifications as a picture display surface. The best practice at the present time involves the use of cloth fabric or woven metal screens which are porous to sound waves and which are good light reflectors.

Another form of screen at present used comprises a solid sheet of material, metal or otherwise, regularly punched with small holes.

The fabric and woven screen types are not particularly good light reflecting screens for motion picture work and the punched metal screens can only be rolled up with difficulty to permit of easy handling.

One of the important objects of this invention is to get all of the advantages of prior known screens with the added advantages of better sound transmissions, light reflection and portability.

The screen of this invention comprises a metal fabric composed of a plurality of small metal surfaces united together to produce an articulated structure. This construction will best be understood by direct reference to the drawing.

The screen is shown comprising a plurality of regularly shaped metal plates 1. It is of course apparent that this invention is not necessarily restricted to the form of plates shown for purposes of illustration. These plates are provided at each corner with integral tongues or tabs 2. These plates with their integral tabs may be readily struck out from sheets of material in automatic machinery. The plates 1 are united together by interlocking the tabs of adjacent plates through round metal rings 3 in the manner clearly illustrated in Fig. 1. The various elements are so proportioned that the ratio of area of the openings between the plates to the area of the plates meets the best practice in the talking motion picture art. The front surfaces of the metal plates 1 provide a light reflecting surface on which the picture is displayed. The opening between these plates must be sufficient to give good sound transmission without being visible to the eye of an observer when he is a predetermined distance from the screen as exemplified in practice by the observers in the first row seats of a theatre. To sum this up there is a critical relationship found to be best in practice between the area of the openings between the plates and the combined area of the plates in any screen. With this structure there results a flexible metal fabric which may be easy rolled up for transportation and which may be readily mounted in a supporting frame under tension to provide a sound picture screen.

In order to make such a metal surface a good light reflecting surface it is necessary to coat the smooth front surface of the plate 1. This invention contemplates a coating compound made up as follows:—active pyroxylin solvents and non-active pyroxylin solvents holding in solution pyroxylin, resins and a plasticizing compound. In this vehicle is mixed a white pigment substance. This substance should be as intensely white as it is possible to obtain. There is also incorporated in the vehicle a substance which will produce a dull surface, or, in other words, a substance which will nullify the shine produced by the vehicle when it dries. This invention contemplates the use of a nitrocellulose and more particularly pyroxylin which is mixed in the solvents to form a solution therein. Suitable active solvents for the pyroxylin are, amyl-acetate, butyl-acetate, ethyl-acetate, or acetone. This solution is diluted with a non-solvent diluent, such as benzol, toluol, zylol or benzene. In good practice about 50% of active solvent and 50% of diluent solvent by volume are employed. The diluent solvent acts both as a thinner and to prevent the softening of one coat when a second coat is applied thereover as will appear later.

About 8 to 12 ounces per gallon of the above vehicle of pyroxylin are used. To give this mixture as intense whiteness as is possible, titanium oxide, zinc oxide and lead oxide may be used. The preferred pigment is titanium oxide which is added to the above solution to the amount of 2 to 3 pounds per gallon of vehicle. To give a dull surface, calcium stearate, aluminum stearate, magnesium stearate or zinc stearate may be used. Calcium stearate is preferably used in an amount of the order of 8 to 12 ounces per gallon of vehicle. Adhesiveness is secured by adding a resin to the mixture. Suitable natural resins are damar, elemi, white rosin, sandarac and mastic; preferably elemi, which is water white, is used in an amount of the order of 4 to 8 ounces per gallon of vehicle. Synthetic resins such as vinylite may be used. A plasticizer is added to prevent shrinkage of the coating when the solvent evaporates. Suitable plasticizers are dibutyl phthlate, tricresyl phosphate or camphor. Any one of these plasticizers may be used in amount of the order of several ounces per gallon of vehicle.

To summarize a desirable coating compound comprises pyroxylin (binder), amyl-acetate and/or butyl-acetate (active solvent), benzol and/or toluol (thinner), titanium oxide (whitener), calcium stearate, (duller), elemi, (adhesive), and camphor (plasticizer).

This coating compound may be applied to the surface to be treated in any number of known ways, but the spray method has been found to be preferable. A surface is properly covered by applying to it, by spraying, for example a number of superimposed coatings or layers. The number of coatings required is dependent upon how densely white it is desired to make the surface. In other words, the more successive layers that are applied, the more intensely white will the surface become. The non-active solvent diluent is employed to prevent the active solvent in each successive coating from biting in too greatly to soften the previously dried layers. Since each successive layer or coating is applied after the previous layer or coating has dried, it is desirable to prevent softening of the previous coating as much as possible by the active solvent of the succeeding layer or coating. This is accomplished by the use of the non-active solvent diluent.

From the foregoing disclosure it will be apparent that my invention involves certain principles of procedure which may be carried out in other ways as will be apparent to those skilled in the art, and I do not therefore, desire to be strictly limited to this disclosure as given for purposes of fully disclosing my invention. I prefer therefore to be limited by the scope of the appended claims.

What I seek to secure by United States Letters Patent is:

1. A sound transmitting and light reflecting picture screen comprising an articulated metal fabric coated with a coating compound comprising a vehicle composed of an active and non-active nitro-cellulose solvent, a nitro-cellulose binder, an adhesive resin and a plasticizer dissolved in said vehicle, a white metal oxide pigment and a metal stearate duller in mixture in said vehicle.

2. A sound transmitting and light reflecting screen comprising an articulated metal fabric having a surface coating comprising amyl-acetate, benzol, pyroxylin, titanium oxide, calcium stearate, elemi and camphor.

3. A sound transmitting and light reflecting metal fabric screen, comprising a plurality of individual metal plates each having a light diffusing surface, and means for uniting said plates into a discontinuous substantially plane surface.

4. A sound transmitting and light reflecting metal fabric screen, comprising a plurality of individual metal plates each having a light diffusing surface and having wings formed on each corner, and rings interconnecting the adjacent wings of the metal plates to form an interrupted substantially plane surface.

5. A light reflecting and sound transmitting screen, comprising a plurality of individual metal plates in substantially the same plane each having a light diffusing surface, and means interconnecting the metal plates to form an articulated surface, the relative area of the plates and the spaces between them being such as to give efficient sound transmission and to present an apparently continuous surface to the eye when viewed from a predetermined distance.

In testimony whereof I have hereunto set my hand on this 24th day of July, A. D., 1930.

SAHATIEL G. MANDALIAN.